(12) United States Patent
Nehman et al.

(10) Patent No.: US 11,783,820 B1
(45) Date of Patent: Oct. 10, 2023

(54) SYSTEM AND METHOD FOR HIGHLY EFFICIENT INFORMATION FLOW USING NATURAL LANGUAGE PROCESSING AND SPEECH RECOGNITION

(71) Applicant: Squire Solutions, Inc., New York, NY (US)

(72) Inventors: Kyle Jeffrey Nehman, Pittsburgh, PA (US); Dennis Alan Underwood, Jr., Oakmont, PA (US); Jeremy Brett Whitsitt, New York, NY (US)

(73) Assignee: Squire Solutions, Inc., New York, NY (US)

( * ) Notice: Subject to any disclaimer, the term of this patent is extended or adjusted under 35 U.S.C. 154(b) by 272 days.

(21) Appl. No.: 17/021,403

(22) Filed: Sep. 15, 2020

Related U.S. Application Data

(60) Provisional application No. 63/073,082, filed on Sep. 1, 2020, provisional application No. 63/006,923, filed on Apr. 8, 2020, provisional application No. 62/901,259, filed on Sep. 16, 2019.

(51) Int. Cl.
| | |
|---|---|
| *G10L 15/18* | (2013.01) |
| *G10L 15/187* | (2013.01) |
| *G10L 15/22* | (2006.01) |
| *G10L 15/30* | (2013.01) |
| *G06F 3/16* | (2006.01) |

(Continued)

(52) U.S. Cl.
CPC ............ *G10L 15/187* (2013.01); *G06F 3/167* (2013.01); *G10L 15/22* (2013.01); *G10L 15/30* (2013.01); *H04M 1/72457* (2021.01); *H04W 4/029* (2018.02); *H04M 2201/40* (2013.01); *H04M 2250/52* (2013.01); *H04M 2250/58* (2013.01)

(58) Field of Classification Search
USPC ................ 704/231, 235, 246, 247, 251, 252
See application file for complete search history.

(56) References Cited

U.S. PATENT DOCUMENTS

| | | | |
|---|---|---|---|
| 2010/0166154 A1* | 7/2010 | Peters ...................... | H04Q 3/66 |
| | | | 379/45 |
| 2014/0099909 A1* | 4/2014 | Daly .................... | H04M 3/5116 |
| | | | 455/466 |
| 2017/0180486 A1* | 6/2017 | Mehta ................. | H04L 43/0852 |

(Continued)

OTHER PUBLICATIONS

USPTO Office Action, U.S. Appl. No. 17,460,391, dated Dec. 2, 2022.

*Primary Examiner* — Leonard Saint-Cyr
(74) *Attorney, Agent, or Firm* — MCGEARY CUKOR, LLC; Vincent E McGeary

(57) ABSTRACT

A system includes one or more field terminals, which can accept information inputs in voice and, optionally, other formats. The field terminals are equipped to translate voice inputs and to populate files according to specified requirements. Artificial intelligence algorithms augment speech to text translation thereby reducing translation errors and decreasing computing time. The field terminal completes the translation, populates the required document according to specified protocols and optionally attaches or associates information such as photos, location, video, maps or any other information that may be useful for the intended resource recipient(s). The field terminal comprises a transceiver, and transmits the file to the intended recipients.

20 Claims, 7 Drawing Sheets

(51) Int. Cl.
    *H04W 4/029*     (2018.01)
    *H04M 1/72457*     (2021.01)

(56) References Cited

U.S. PATENT DOCUMENTS

2018/0367943 A1\* 12/2018 Pipes .................. H04W 4/02
2020/0125218 A1\* 4/2020 Bender ................ H04L 51/04

\* cited by examiner

MEDEVAC - INFORMATION REQUIREMENTS
*Two-part report (MIST / 9-Line) outlines required information for MEDEVAC launch*

MEDEVAC
MIST Report

(M) Mechanism of injury
Penetrating trauma, blast, etc.

(I) Injury
Gunshot wound, evisceration, etc.

(S) [Signs and] Symptoms
Stable/Unstable; vitals, etc.

(T) Treatment [rendered/required]
Needle-decompression, splint, tourniquet, etc.

MEDEVAC
9-Line Report

(1) Location
Grid location, pre-established Helicopter Landing Zone (HLZ), etc.

(2) Radio frequency/call-sign
Primary Sat, relay through "Aces", etc.

(3) Number of patients by precedence
A - Urgent; B - Urgent Surgical; C - Priority; D - Routine; E - Convenience (4) Special equipment required
A - None; B - Hoist; C - Extraction Equipment; D - Ventilator (5) Number of patients by status
A - Ambulatory; B - Litter (6) Security at pickup site
A - "Hot"; B - "Cold"

(7) Method of marking pickup site
A - Panels, B - Smoke, C - IR, D - None, etc.

(8) Nationality [status]
A - US Military; B - US Civilian; C - Non US Military; D - Non US Civilian; E - Other (9) Nuclear, Biological, Chemical (NBC) contamination
A - Nuclear; B - Biological; C - Chemical

FIG. 3

EXAMPLE MEDEVAC SCRIPT - INFORMATION REQUIREMENTS

*Two-part report (MIST / 9-Line) outlines required information for MEDEVAC launch*

① Example 1 (with scripts)
- Actual calls in field

MIST
- "Eagle down, Alpha-1, MIST to follow..."
- "Mechanism of injury is penetrating trauma"
- "Injury is gunshot wound (GSW), upper left arm"
- "Signs and symptoms are stable / conscious"
- "Treatment is tourniquet left arm"
- "9-line to follow" or "standby for MEDEVAC 9-line"

9-Line
- "Location is HLZ Wren; 4QFJ 1234 6789"
- "Radio frequency is primary SATCOM, call sign Alpha-2 // BREAK"
- "Only one patient, urgent surgical"
- "Special equipment required is none"
- "One patient is ambulatory"
- "HLZ is cold / secure"
- "HLZ will be marked with smoke"
- "Nationality is US Military"
- "CBR is none"

② End products or outputs (i.e. the system sends/auto-populates below)

MIST
- Mechanism of injury – penetrating trauma
- Injury – GSW, upper-left arm
- Signs and symptoms – stable
- Treatment – tourniquet, left arm

9-Line
- Location – HLZ Wren (4Q FJ 1234 6789)
- Radio frequency/call sign – primary sat.; A2
- Number patients (precedence) – 1; urgent surgical
- Special equipment – none
- Number patients (status) – 1, ambulatory
- Security at pickup site – cold/secure
- HLZ marking – Smoke
- Nationality – US Mil
- CBR - none This is ready to send!

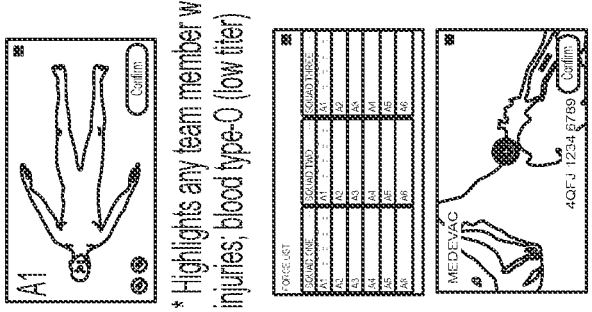

\* Highlights any team member with injuries; blood type-O (low titer)

FIG. 4

SYSTEM AND METHOD FOR HIGHLY EFFICIENT INFORMATION FLOW USING NATURAL LANGUAGE PROCESSING AND SPEECH RECOGNITION

CROSS-REFERENCE TO RELATED APPLICATIONS

The application claims the benefit of:
(i) U.S. Provisional Patent Application No. 62/901,259, entitled "System And Method For Highly Efficient Information Flow Using Natural Language Processing And Speech Recognition," filed on Sep. 16, 2019, which is incorporated herein by reference; and
(ii) U.S. Provisional Patent Application No. 63/006,923, entitled "Electronic Payment Platform With Voice and Speech Recognition and Voice Authentication," filed on Apr. 8, 2020, which is incorporated herein by reference; and
(iii) U.S. Provisional Patent Application No. 63/073,082, entitled "System and Methods with a Multimodal Interface for Command and Control (Inputs) and Monitoring (Outputs) of Unmanned Systems," filed on Sep. 20, 2020, which is incorporated herein by reference.

FIELD OF THE INVENTION

The invention relates generally to the field of efficient information flow and more particularly to systems and methods utilizing Natural Language Processing (NLP) and Speech Recognition in voice-control to automate certain command functions and generate on the fly text, graphic, geo-locational and other tagged files from a mobile terminal.

BACKGROUND

Tactical operations, such as emergency response in the military or among other professions involving human operational components (e.g. a pilot for an aircraft), often pose significant challenges and risks stemming from poor information flow. Furthermore, information overload affecting key individuals and information chokepoints prevent actions during mission-critical moments. As a result, inefficient information flow and related requirements can cause delayed actions and, in some cases, cost lives. For example, a delayed Medical Evacuation or "MEDEVAC" helicopter launch, or a delay for a backup unit to arrive on scene, may mean the difference between life and death. Especially during high-risk operations, such information chokepoints become amplified during time-sensitive situations, as do the resultant adverse effects and negative consequences. Tactical operations virtually always involve some form of human-to-human communications, which can be a large contributing factor regarding information chokepoints.

Regardless of training or the equipment in use, human-to-human communications typically involve numerous short-comings, especially during emergent situations. Examples include a higher potential for human error with each transmission or re-transmission, time-delays due to redundancies in communicating pertinent information, or some combination of both, particularly when communicating information via lengthy prescribed channels (i.e. having to relay through some human intermediary such as a 9-1-1 dispatcher, an aircraft overhead, or military headquarters, etc.) versus communicating directly with the end-user of that critical information. Moreover, human factors and technological (or communications) limitations increase risk to personnel due to increased cognitive overload on key individuals, as well as a lack of situational awareness (e.g. a pilot that loses focus on flying the aircraft because he/she is instead focused on attempting to reach Air Traffic Control on the radio, to let them know that an engine has shut down). Another example might occur during a special operation, when a combat medic loses focus on a patient because he/she is instead focused on re-transmitting information over the radio (perhaps due to a poor radio or signal connection); again, at times such information is required before a MEDEVAC helicopter can takeoff from the base.

Despite the errors introduced by human-to-human communications, particularly in hierarchical organization or communication structures, no alternative communication structures have emerged to significantly optimize such communications. The result has been lost lives in military and emergency rescue scenarios and lost efficiencies in commercial scenarios.

SUMMARY

The systems and methods according to the principles of the invention address these and other shortcomings. In an exemplary embodiment, the system translates information from natural language to particular information requirements at the field terminal level. Automatic translation allows key individuals to focus on the primary task versus diverting valuable attention to a machine interface while attempting to communicate vital information. A system according to the invention eliminates or reduces the need to re-translate, re-package, re-format, or re-transmit information to end users, intermediaries or resources. Ultimately, the system revolutionizes information flow in an unexpected way by utilizing voice-control and speech recognition, in conjunction with artificial intelligence and select enhancing or overlapping technologies such as geo-locational, camera, wearable, or other sensor technologies, to streamline the flow of information in near real-time to end users of that information. The unexpected resulting benefits include flattening hierarchical communication structures and streamlining information flows within structures.

An exemplary system includes one or more field terminals, which can accept information inputs in voice and, optionally, other formats. The field terminals are equipped to translate voice inputs and to populate files according to specified requirements. In an exemplary embodiment artificial intelligence algorithms augment speech to text translation thereby reducing translation errors and decreasing computing time. In yet another embodiment, the speech translation implements customized dictionaries and enhanced phonics mapping based on the vocabulary and protocol requirements of the use case.

Optionally the field terminal permits a user to store in advance data, such as location, injury descriptions, identifying information or the like so that the user need not input such data in the field. In still another embodiment, the field terminal may intelligently store GPS or other geo-location data, time stamps, photo or video or even sound recordings. In a field event, the user inputs the voice or other data necessary for the particular requirement. The field terminal completes the translation, populates the required document according to specified protocols and optionally attaches or associates information such as photos, location, video, maps or any other information that may be useful for the intended resource recipient(s). The field terminal comprises a transceiver, and transmits the file to the intended recipients, advantageously, without need to relay the information through human-to-human translation or relay points.

In an exemplary method in response to a field event, a user deploys to the field event location. The field event can be, for example, an injury to a human requiring assistance. Some information may be known concerning the field event, such as location, type of injury, identification and resource requirements. Optionally, the user inputs such known information to the field terminal and associates it with an identifier (also called a brevity code). In the field, the user inputs information pertinent to the field event and the requested resource using speech and optionally other input modes.

The user or the field terminal identifies the necessary protocol. For example, if the field event requires a helicopter evacuation, the appropriate request protocols, including any text documents or file format requirements, are identified. If the field terminal stores pertinent information for the field event, the already stored information is recalled by its identifier or brevity code. The field terminal translates the speech or other inputs into text or other appropriate formats, extracts the necessary information according to the protocols, populates the appropriate text fields, associates additional files, such as photo files, and prepares the transmission package. The user may verify the information before transmission via the terminal interface. The terminal sends a multi-level communication if desirable such that the requested resources can be allocated in parallel.

This new approach to information flow is made possible, primarily because the system according to the principles of the invention fundamentally changes the way that information is:
- captured—such as speaking into a device versus writing notes;
- extracted—using voice/commercial artificial intelligence capabilities; edge-computing;
- routed—data/text files uploaded to a device before transmitting externally, requires less bandwidth, enabling easier and faster transmissions; messages or files can be sent to multiple nodes simultaneously rather than repeated or relayed via unnecessary intermediaries.

In doing so, the system enables better decisions, faster action, and accelerated execution of related tasks.

Advantageously, translation occurs in near real-time. The system automates repetitive tasks and eliminates unnecessary delays that arise from information jams or bottlenecks, and reduces time for contingency activation during time-sensitive situations (i.e. reduced time to enable an ambulance or MEDEVAC to take off, etc.). Accuracy improvements result from the voice technology of the system as well, as compared to human-to-human communications that inherently involve human error through message receipts. The system also enables further documentation, for example by storing voice-cut recordings or text recordings for follow-on, post-mission analysis and learning; it also affords opportunities for future data analytics that previously did not exist in the context of other pre-existing systems such as the military's standard radio suites or communications capabilities. Because the terminal communicates according to the formal protocol requirements of the entire communication structure, there is no need to relay the communication through a relay hierarchy. All nodes and endpoints can receive the communication in parallel.

BRIEF DESCRIPTION OF THE DRAWINGS

FIG. 3 depicts an exemplary MIST/9-Line document;

FIG. 4 depicts an exemplary voice input translation according to the principles of the invention;

DETAILED DESCRIPTION

Figure 1:
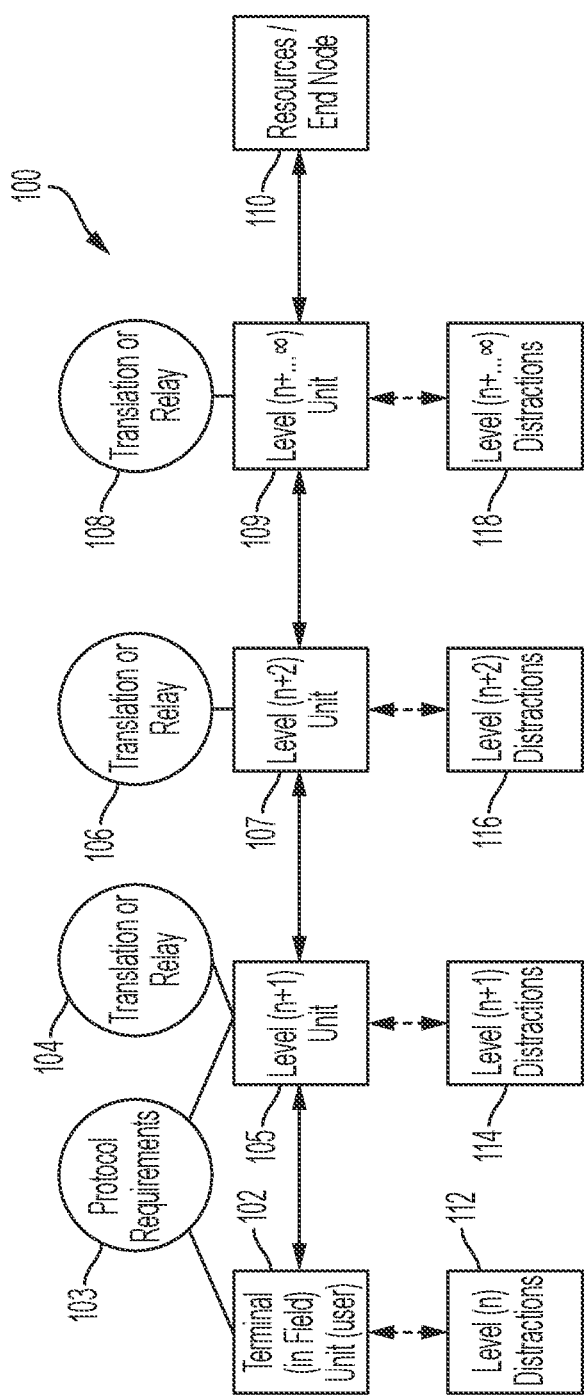
FIG. 1 depicts a prior art system for deploying medical evacuation helicopters.

FIG. 1 shows a prior art system and method 100 for deploying medical evacuation helicopters. It depicts information flow in the context of a MEDEVAC scenario, as it may typically occur during military operations. In the field, users 102 at a field event require medical assistance, including a medical evacuation helicopter. The users gather the information required to make such a request according to MIST/9-Line protocols. MIST/9-Line protocols embody formal protocol requirements 103 relating both to content of a communication and the formalities of the communication. The users may gather such information using notes or otherwise gathering the necessary data. The users make voice contact to translation or relay point 104 via a communications link such as a satellite link. In a voice-to-voice communication a human at 104 gathers the MIST/9-Line information and translates the information to a MIST/9-Line document. The translation or relay point relays the MIST/9-Line through a chain of relay points 106, 108 to the resource end point 110, in this case a medical evacuation helicopter. The helicopter 110 responds based on the received information.

As can be seen from the above, each step in the communication link introduces potential error, and the communication must traverse n levels. The users gathering information and using voice to transmit vital information to the administrator may be distracted by their environmental conditions, including potential enemy fire 112. The initial translation 104 may introduce error. The communications chain also introduces delay and error at each level of communication where additional level specific distractions 114, 116, 118 may upset the information path.

The system according to the principles of the invention utilizes speech recognition and speech to text, in conjunction with complimentary overlapping technologies (e.g. GPS or other geo-location technology), to capture required information at origin, translate it into appropriate MIST/9-Line reports, which inherently become actionable in final format. Information is then ready for dissemination, including related reports to any or all relevant stakeholders.

Figure 2:
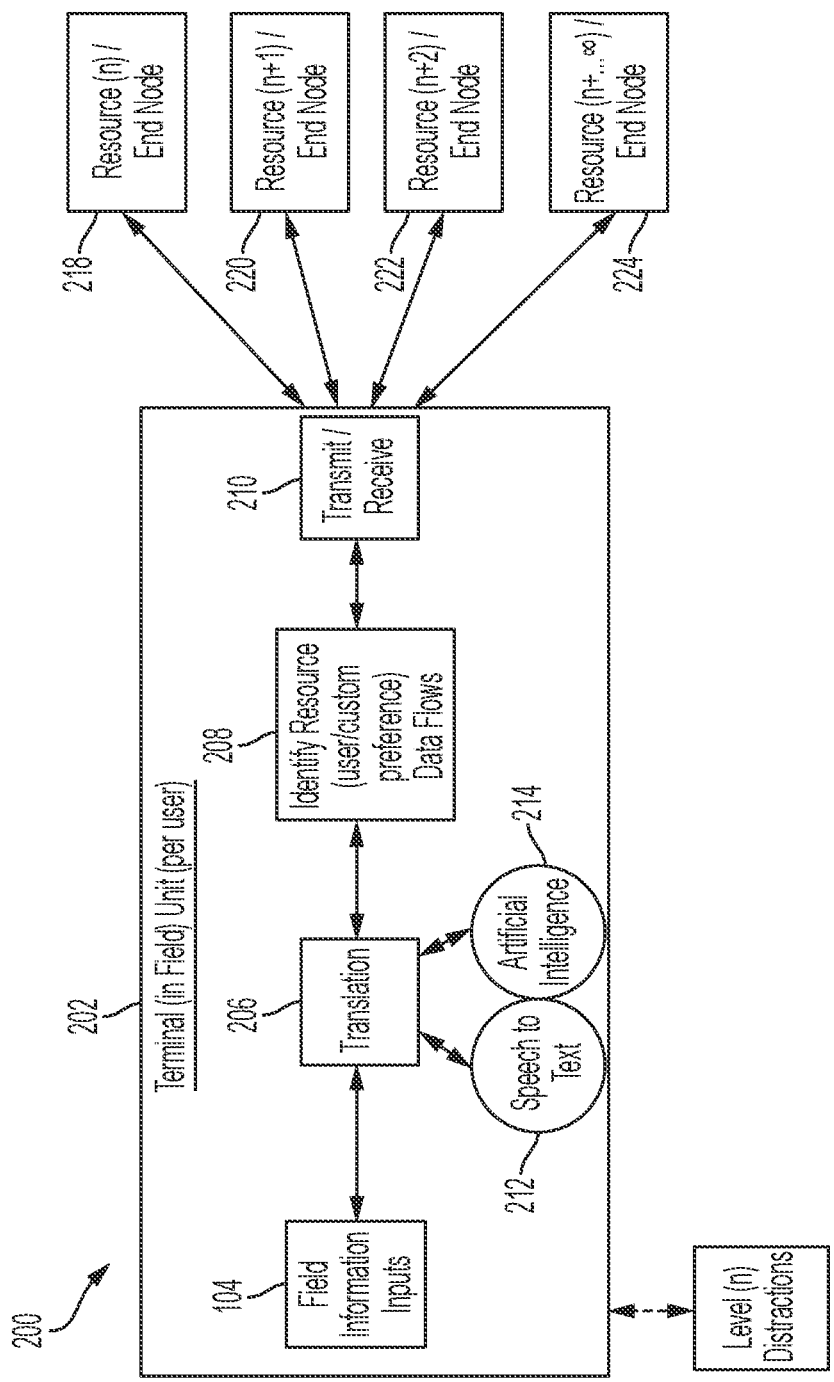
FIG. 2 depicts an exemplary system according to the principles of the invention.

FIG. 2 illustrates an exemplary system 200. A field terminal 202 comprises an interface 204 for receiving field information inputs, including voice inputs. The interface may further comprise additional inputs such as sensory inputs, gesture inputs, key inputs, tactile inputs and eye movement inputs. The field terminal comprises a transceiver capable of network communication over one or more communication channels. The field terminal also comprises a geo-location function, such as a Global Positioning System sensor and related software, cell tower location, IP address location, RF location methods, manual entry of location, derived location form photographs, or derived form positional data communicated through networked communication with other terminals.

The field terminal comprises a data processing system having a processor, memory, storage and other components necessary to carry out the functional modules described herein. For purposes of this disclosure, a functional module includes the hardware, software, circuitry and other resources necessary to carry out the described functions. It will be apparent to a person of ordinary skill in the art after having read this disclosure how to arrange and implement the described functional modules in the described data processing system.

A translation module 206 process voice inputs and accesses speech to text 212 and artificial intelligence 214 functions to translate voice inputs to populate a protocol specific document, such as a MIST/9-Line report. A module 208 identifies the resources required, either via user inputs, custom preferences or other criteria, which would be known to person of ordinary skill in the art after reading this disclosure. The terminal 202 prepares a communication package and provides communication instructions to the transmit/receive module 210. The package is transmitted to resource nodes 218-224 in parallel. An advantage of the exemplary system is that only field level distraction 216 may impact the information flow because each resource node 218-224 directly receives the communication from the field terminal. Another advantage of the system is that the use of a field level mobile terminal according to the principles of the invention transforms the downstream information flow channel.

The translation module implements natural language processing using speech to text conversion and artificial intelligence. Language processing engines identify words and grammar to derive meaning from inputs (e.g. speech or text) and combines artificial intelligence with computational linguistics to process and understand the natural language received by the computer. See, Technavio.com; Global Language Processing Market, 2017-2021 (2017), Infiniti Research Limited. Another report refers to speech recognition as "the ability of a machine to understand and carry out spoken commands by interpreting articulated words." Hadad, J. (2017); IBISWorld Industry Report OD4531; Speech and Voice Recognition Software developers in the US. In this exemplary embodiment, enhanced speech to text optionally includes a custom dictionary optimized for the protocols and environment at issue.

The exemplary embodiment of FIG. 2 uses a multi-stage analytical process to provide high fidelity voice to text results, even in offline or noisy environments. First, ingested voice is transmitted to a voice to text engine in either streaming or stateful form. This engine leverages machine-learning algorithms to produce text which provides a probability-weighted list of possible voice to text results. This engine may be remote, such as cloud-centric, or local to the device.

The output text from this Voice to Text stage is then ingested into a Text Accuracy Layer. This Text Accuracy Layer uses the Double Metaphone encoding algorithm to convert the output text into a string representing the pronunciation. A person of ordinary skill in the art after reading this disclosure will understand how to implement the Double Metaphone encoding algorithm, and will further understand that other encoding algorithms exist. The Text Accuracy Layer then calculates the Levenshtein Distance between the given pronunciation and the expected string. A person of ordinary skill in the art after reading this disclosure will understand how to calculate the Levenshtein Distance and how to use the results to attain high fidelity speech to text according to the principles of the invention. The dictionary of expected words and phrases centric to the system is finite, and the Double Metaphone encoding output is saved in a pre-computed manner. Therefore, this previously computed text representation of the pronunciation, when compared, provides a much higher fidelity alignment to the expected words than voice to text alone.

A different embodiment of this process can be implemented for longer strings, on devices with appropriate computing processing resources. In this embodiment, larger strings are examined post-voice to text output for more conversational environments. The larger strings are broken into a large set of substrings, which then follow a similar pronunciation process. Due to the larger amount of data available, additional probabilistic analytic capability, to include machine learning algorithms, are applied as CPU, memory, and time allow, are applied in this environment, to provide additional speed and accuracy to the identification of dictionary text.

For context, the exemplary system illustrates a MEDEVAC use-case scenario; however, a person of ordinary skill in the art after reading this disclosure will appreciate the applicability to other use cases. While similar information requirements, conceptually, may apply to other use-cases such as when requesting backup during a military operation, this MEDEVAC use case scenario was designed in the context of military operations, which often occur in remote locations or austere environments. On a related note, such environments often present added challenges relating to communications capabilities, as many foreign countries or locations such as Iraq or Afghanistan often do not have the same infrastructure or cellular/internet connectivity available in the United States. For this reason, specifically, the system or platform was developed to be compatible for use in both an "online" and "offline" mode, depending on limitations of the environment. In off-line mode, the field terminal communicates the package as soon as it establishes a suitable communications link.

FIG. 3 is a two-part report (MIST/9-Line) 300 describing the information required prior to MEDEVAC launch or takeoff. Before allocating resources, this information must be provided in sufficient detail and in the proper format. As can be seen, the report requires information concerning the injury, location in grid coordinates, the required special equipment and the like. It is one advantage of the exemplary system that aspects of the report may be prepared in advance and stored in field terminal, as particular use cases may repeat in particular locations or for particular on the ground military activities. A user in the field can access partially completed reports thereby saving valuable time. Because the field terminal 202 comprises voice inputs and intelligent speech to text, the user can quickly input missing information and the terminal prepares the 202 the report for transmission. A person of ordinary skill in the art after reading this disclosure will understand how to implement other formatted communication requirements in a system according to the invention.

In an exemplary embodiment, users provide the system with the relevant inputs in terms of the required information necessary to complete or fully populate a MEDEVAC MIST and 9-Line report (in some type of XML or similarly structured format), preferably at the point of origin. Once the user has finished providing all necessary inputs, they are able to visually and audibly confirm the accuracy of their intended MIST and 9-Line reports by either visually confirming the text of the reports, or by requesting an audio "playback" or speech to speech confirmation of what the user had provided for inputs or by viewing the document in a heads up display environment. Once the information has been confirmed by the user or operator, the MIST and 9-Line reports are ready to be transmitted via data or text messages, which reduces the amount of time and bandwidth required to send information, and it also mitigates further risk of human error, inaccuracies, or the need for redundant re-transmissions.

Optional additional features extend beyond the minimum information requirements of a basic MEDEVAC MIST and 9-Line report. GPS or other geo-location technologies can be incorporated into the platform, as well as other capabilities to accommodate for benefits such as future data analytics. All entries are date and time-stamped for post mission learning or analysis. Users can also specify exactly how, when, and to whom the final reports will be sent to. In other words, the system may be setup so that finalized MIST and 9-Line reports are sent to higher headquarters, other teammates, directly to the MEDEVAC unit, or to all other stakeholders simultaneously, if desired.

FIG. 4 illustrates an example script 400 of inputs that might actually be used during an operation, and the corresponding MIST and 9-Line report that the system outputs, as a result (again, in final form, text format, ready to send). The left column 402 represents voice inputs and the right column 404 the resulting text output storable as an electronic file. A person of ordinary skill in the art will understand how to implement a field terminal compatible with known communications platforms and compliant with known industry standards. The exemplary embodiment meets industry standards in terms of appropriate security and encryption requirements.

A system according to the principles of the invention enables enhanced information management. Pertinent information to be pre-loaded to a field terminal to streamline information flow even further, such as pre-loading team member or soldier biometric information, blood-type, and so forth, pre-loading grid-coordinates of pre-planned Helicopter Landing Zones or "HLZs" for where a potential MEDEVAC helicopter might land in the vicinity of a military or emergency response operation. A field terminal can track vital signs information or other information such as team members' medications, allergies height, weight, or the like. Information and data entry can be configured in accordance with military operations standards regarding MEDEVAC scenarios and the Tactical Combat Casualty Care or "TCCC" formatting guideline. Logged entries can be provided with date/time-stamped information, data analytics and attached files such as photos, maps, or voice recordings.

In addition to the examples provided, the system can support a various needs, use cases, operational roles or other components for both military and non-military applications. For example, the system 200 may include a Digital—Close Air Support module (also known as "Digital-CAS") that serves to enable the same capability in terms of voice-control, automation and streamlined information flow for digital-CAS, as compared to the MEDEVAC module. The digital-CAS module populates the final information requirements for CAS (e.g. a different type of "9-Line" report). As described, other examples exist (including the associated reports) such as Search and Rescue operations that require a 15-line information report, before certain phases of rescue and commence.

Similarly, a call for immediate backup, or otherwise known as a Quick Reaction Force (QRF) or Immediate Reaction Force (IRF), requires a different set of information to launch. Again, the system can accommodate for any and all of these types of reports by populating a final form, digital readable text data package before transmission. Not only does this methodology require less bandwidth, but it inherently affords lower probability of interception and lower probability of detection in terms of communications and signal capabilities. Another example includes reports for mission updates, such as the SALTA report (Size, Activity, Location, Time, Actions). It is important to note that formatting requirements may vary across different geographic locations, or in different combat theaters. So, to illustrate this further, a hypothetical SALTA report for a mission update is outlined below:

Size: "size is two armed-enemy combatants"
Activity: "activity is enemy are engaging US forces with small arms fire"
Location: "location is approximately 300 meters to the east of village XX, or east of current location"
Time: "time is now, or five minutes ago, or 1445 local, etc."
Actions: "action is US forces are disengaging enemy personnel, departing the village to the west, and returning to base"

The SALTA module provides the same function as does the digital CAS, MEDEVAC, or QRF modules, with the only difference being that each module has a unique, pre-defined set of possible inputs and outputs for the eventual transmission of a final data package and related feedback mechanisms associated with each specific module. The system can accommodate every standardized operational report, including the specific information requirements thereof for final reporting and transmissions. This essentially eliminates any need for continuous two-way voice-communications for hundreds of different situations, completely streamlining information.

Figure 5:
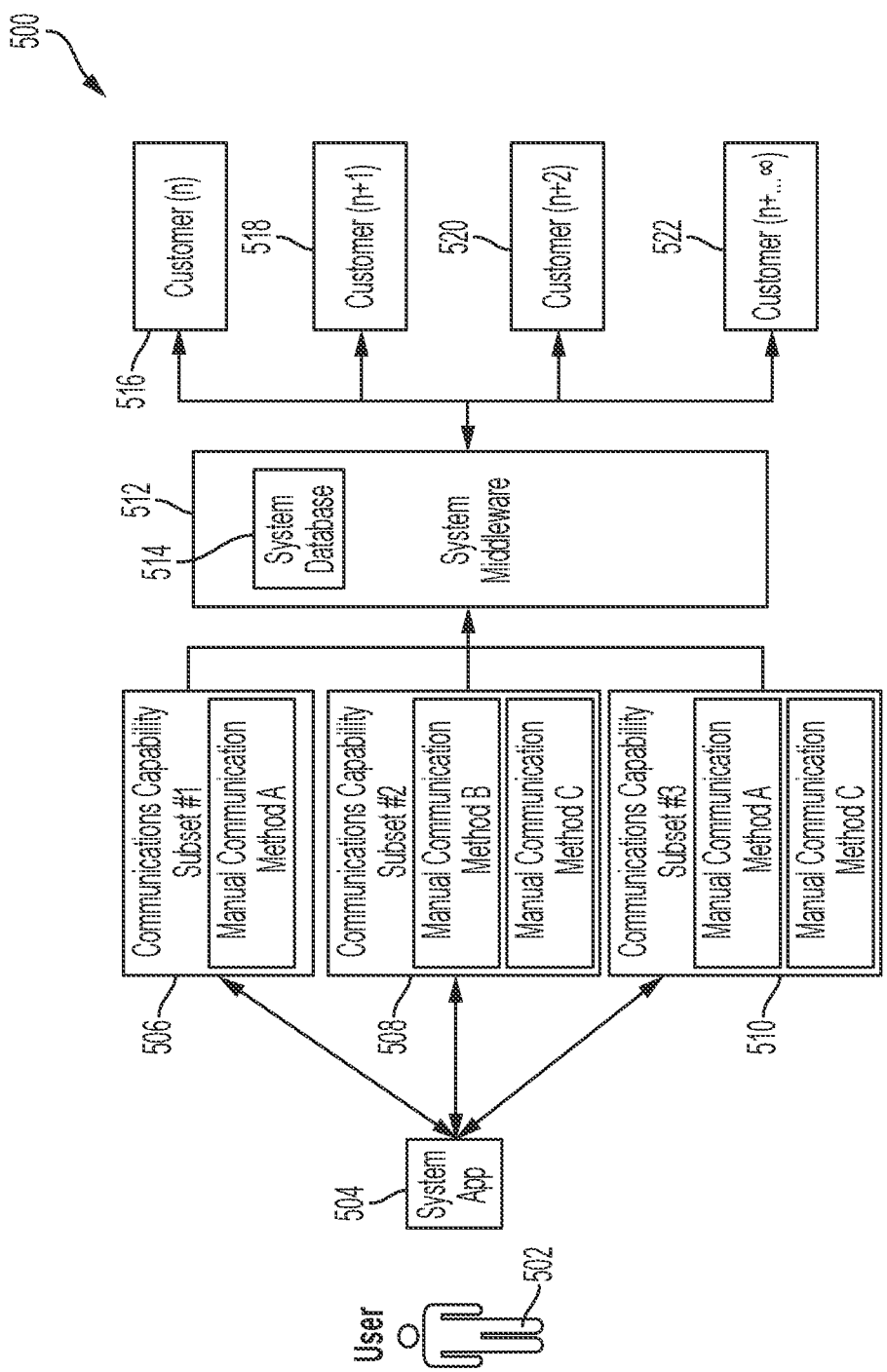
FIG. 5 depicts another exemplary system.

FIG. 5 illustrates an exemplary system 500 configured to permit a user 502 to communicate to various organizations 516-522 across disparate communications channels 506, 508, 510 without individually configuring each communication. Customer organizations as used here may encompass various commercial or non-commercial organizations that may need to coordinate on an event. So, for example, the organizations 516-522 may be a supply chain for fulfilling a commercial transaction or may be various public service entities such as police departments, fire departments, hospitals and the like. It should also be clear that the user 502 can be expanded to a plurality of users or may comprise a team of users, such as a plurality of police squads, and that the customer organizations may also comprise plural users.

The terminal 504 comprises voice translation functionality, transceiver functionality, brevity coding functionality, storage and computing capabilities as previously described. The terminal 504 further includes a local database (not shown) that holds configurations, brevity codes, partially completed communications according to formal protocol requirements, mission requirements, team member communications, communication channel capabilities, customers and any other data necessary for a user terminal. The local database preferably comprises the same data framework and data models as the middleware system database 514.

The communications channels 506, 508 and 510 are disparate, and may comprise different formatting and information requirements in communication as well as different physical or virtual links. These preferences can be configured in the mobile terminal such that the user need not select or otherwise configure communications channels in the field. User 502 inputs voice commands and information to a terminal 504 and selects desired organizations. Based on a minimum of voice inputs, the terminal translates voice into the required communication formats and packages transmission according to the selected or pre-configured communication capability. The terminal 504 also determines the appropriate communication channel for the desired organization.

Preferably, middleware 512 comprises a database 514 for storing message data, organization state data, interaction data and the like. A person of ordinary skill in the art after having read this disclosure will understand how to configure and implement middleware 512. The terminal 502 intelligently communicates the vital information to the appropriate organization 516-522 via the middleware. The user 502 using voice interactions operates agnostically or with minimal information as to the details of the communication channel requirements and customer organization information formatting and protocol requirements.

In an exemplary method, the system database 514 holds the configuration and task data for the customer organizations 516-522 and all users 502. The local terminal databases and system databases are synchronized through the middleware server 512. The user 502 terminals can be in communication with each other even when offline from the system server 512, such as by Bluetooth, radio links or other network communication. In one aspect of the invention, the users may form a mesh network such that changes to user local terminal databases may be synchronized across user terminals. When a terminal 504 connects with the system server 512, the system database updates to reflect changes on the local terminals. Likewise, customer organizations 516-522 communicate with the system server 512 and have access to updated system database 514. If customer organizations send communication to a user 502 while a terminal is off-line, the system server can store the communication and send it to the user when the user goes on-line and maintain state information in the database 514. In this manner, customer organizations may also communicate with each other even if such organizations do not have direct communication channel capability.

Figure 6:
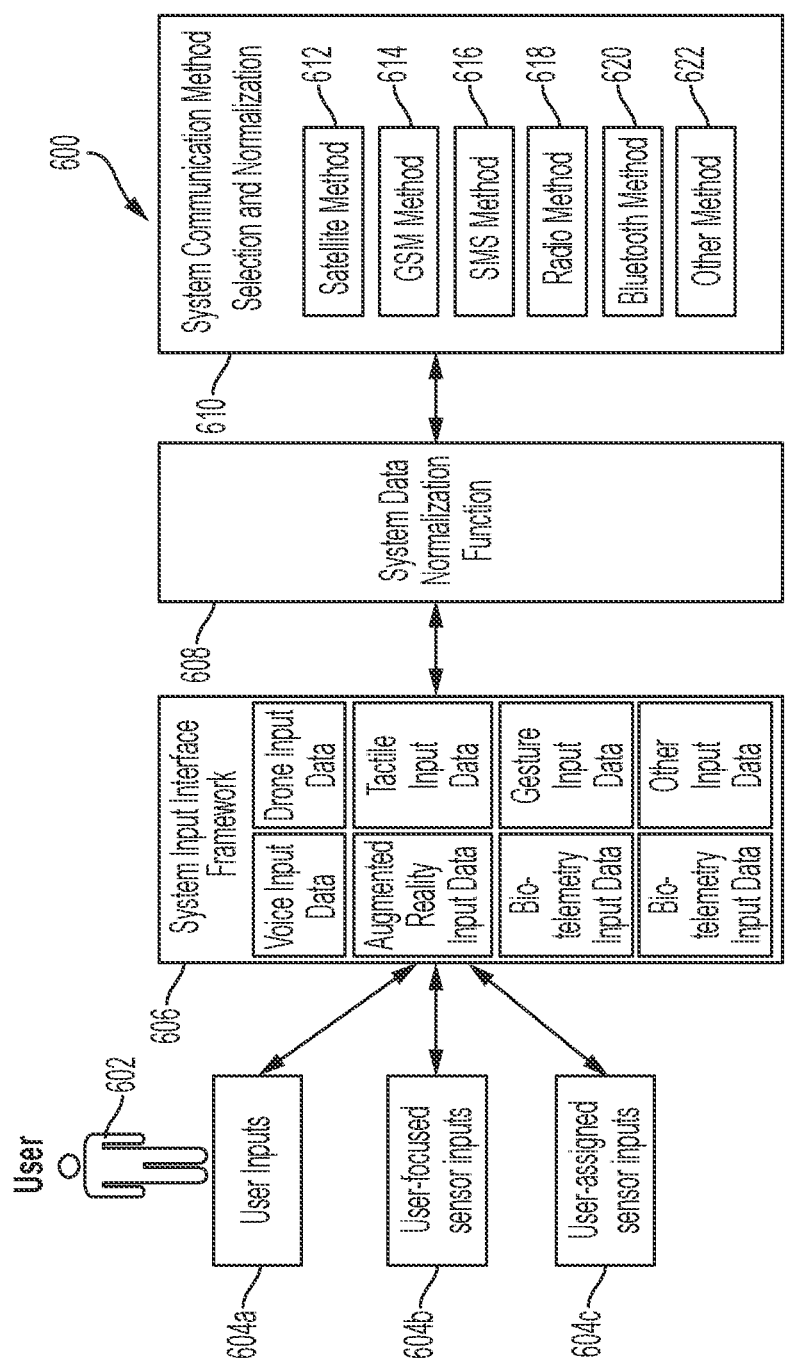
FIG. 6 depicts an exemplary system implementing multi-modal inputs.

FIG. 6 illustrates an embodiment of the system 600 according to the invention comprising a multi-modal user interface 604a-c, 606. The user 602 inputs include voice, tactile, sensor (such as bio-telemetry, gesture, eye movement) or user assigned inputs 604a-c such as drone or other sensor platform assigned to user 602. The input interface framework 606 comprises modules for processing data inputs, including voice, drone inputs, augmented reality inputs, tactile, bio-telemetry, gesture, and others that may become available. It will be apparent to a person of ordinary skill after reading this disclosure how to implement the user inputs and input interface framework modules in a field terminal. Preferably, the input interface framework also includes adapters for the input types such that inputs may be accepted locally at the terminal device or over local network interfaces such as Bluetooth or remote network interfaces using IP, LAN or WAN technology. Implementing adapters will be apparent to the skilled artisan. It will also be apparent that the framework 606 supports outputs to the interface. For example, the voice interface can provide voice outputs such as verifying a formal communication in voice. The augmented reality further supports a heads up display, which can read-out data from a terminal's local database (not shown) or display a completed formal requirement communication such as a MIST/9-Line.

The data normalization module 608 accepts the data inputs and contains a data model that normalizes all such inputs to one data format. A data dictionary comprises correspondence between native input data formats and normalized data formats. The multi-modal input may be used in connection with the exemplary systems and functions discussed with respect to FIGS. 2-5. Thus, for example, the multi-modal input data can be normalized and translated to meet communication requirements, such as with a MIST/9-Line medical evacuation request document.

Brevity coding and pre-loading functions can be supported in a multi-modal input device according to the principles of the invention. Advantageously, for example, a terminal according to the principles of the invention can be configured to communicate with a user's wearable sensor to track vital statistics, such as pulse and blood pressure. The user's terminal can be configured with a brevity code to retrieve location, vital statistics and a partially completed MIST/9-Line communication. In the case of injury, another team member can use the injured team member's terminal to communicate the MEDEVAC request, or all team member devices can be in communication so that all local databases are the same. In such case, any team member will have the injured member's data available for the MEDEVAC request. Additionally, the normalized input data can be translated to another data format, for example command data for a drone or other unmanned vehicle. The normalized data can be transmitted via suitable communication method 612-622 for use by other users, customer organizations, or other system processes.

The exemplary system can include modules for non-military applications, such as for consumer-facing business segments and inventory management systems. Such a system may accommodate order sheet creation, processing, and delivery into backend systems for more efficient inventory management. The module within the system accommodates voice-automation, voice-control and translation into an order sheet, before the associated product order is then sent for inbound processing directly into backend systems relating to inventory management and/or order processing. For this module, consumers speak the desired brand, category, flavor or strain, specific item, and volume or quantity desired. The output is then transmitted in a final form order sheet, in digital readable text, directly into backend systems for further processing.

This module also accommodates brevity-coding features, whereby users can pre-load or pre-define certain parameters within the module, to further streamline information flow or simply out of convenience. Consumers can create their own customized orders, which they then can activate and send utilizing voice-control thereafter. So, if a consumer customized a favorite order with the desired brand, quantity, flavor or strain, category, and item, the consumer can then utilize brevity coding for that order by titling it however they choose (e.g. "favorite order number 1"). Then, within the module, when the consumer says "favorite order number one," the same exact order sheet populates, and the consumer simply needs to confirm to send.

The system also allows users to create entirely new modules, within their own accounts. So, if a business has a team of employees that often utilize certain pieces of information or specific information requirements within its business operations, those users can create and define their own modules for a similar capability, based on whatever their information needs are. Essentially the system and its modules unlock voice-driven information inputs to meet users' needs as appropriate.

Figure 7:
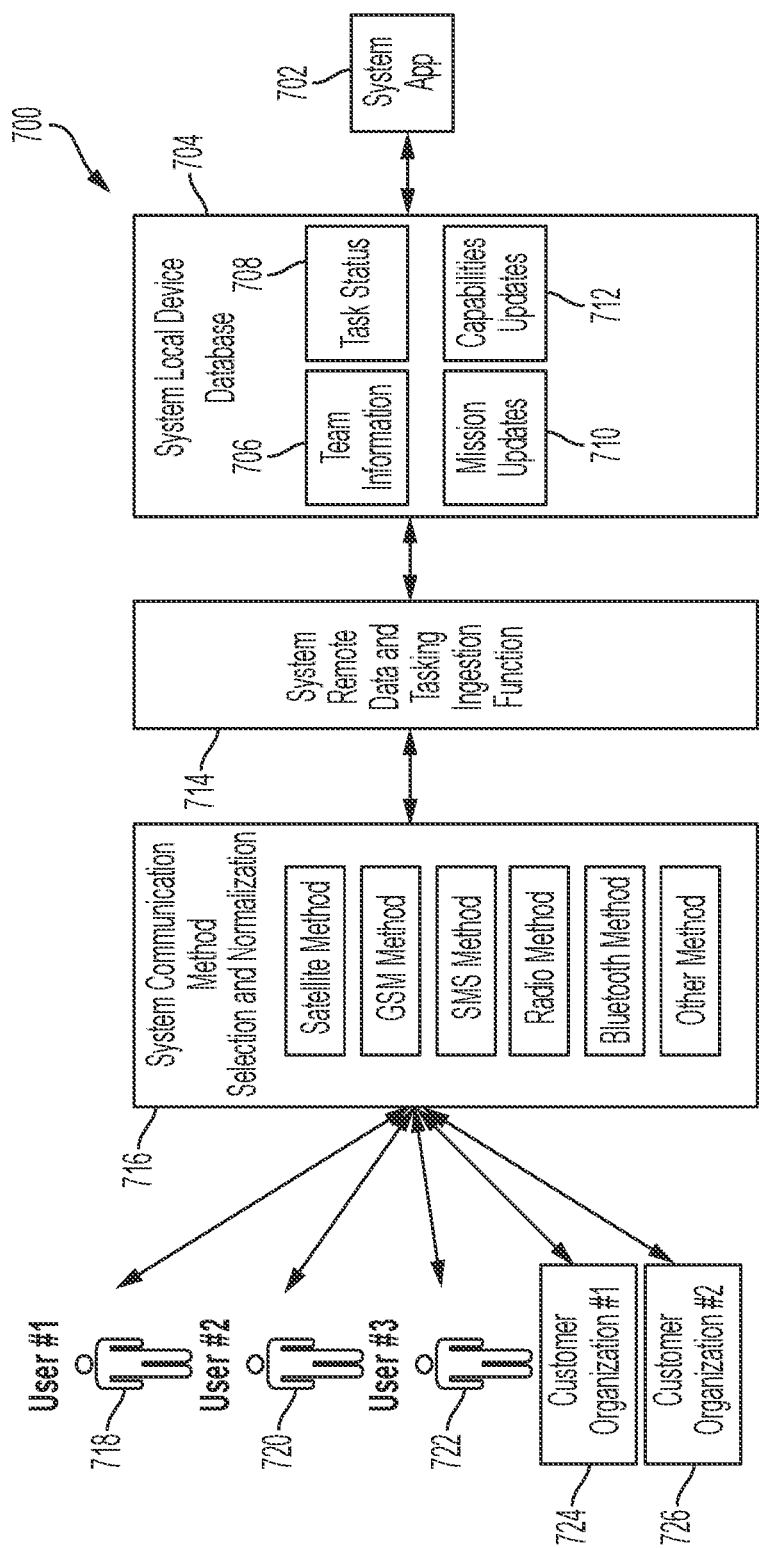
FIG. 7 depicts another exemplary system.

FIG. 7 shows an exemplary system 700. In this embodiment, the system application 702 includes the functional modules permitting a mobile terminal to respond to voice commands or other user inputs according to the principles of the invention and to prepare and send communications according to formal protocol requirements as previously described. In addition, the system application 702 accesses and tasks a local device database 704 comprising various data sets 706-712. In this example, the data sets are team information 706, task status 708, mission updates 710 and capabilities updates 712. A person of ordinary skill in the art after having read this disclosure will understand how to implement the local database 704 and will further understand that other data sets can be stored in the database. Among other functions, the system app 702 can respond to voice or other inputs to access data in the database to prepare electronic files for transmission and to access pre-configured communications channel selections. In one aspect of the invention, the database further stores identifiers for recipients of messages so that communications can be intelligently filtered and directed without the need for the user to establish such communications in the field.

The system remote data and tasking ingestion function 714 handles task requests including requests to establish communications, accessing local database 704 for the configuration and recipient attributes. The system communication module 716 responds to the task ingestion function 714 and causes the terminal to establish communications with designated recipients according to the selected or stored communication channel and method. In this case, the terminal responds to user commands and sends a communication having formal protocol requirements to a team having user 1, user 2, and user 3 718, 720, 722. Teams can have any number of users. The local databases 704 of the users 718-722 can be synchronized, initially as pre-configured and also via a system server as previously explained, via peer to peer or mesh connections, or both. Customer organization 1 and customer organization 2 724, 726 communicate with each other over respective channels 716, as explained with respect to FIG. 5. Customer organization may also communicate with users via the middleware server, also as explained with respect to FIG. 5. A person of ordinary skill in the art having read this disclosure will understand how to implement the above described modules to provide a configurable and flexible communications mobile terminal responsive to voice and other inputs to achieve mission critical communications efficiently.

It will be apparent to persons of ordinary skill in the art after reading this disclosure how to implement the above-described functional modules in a mobile terminal. It will be apparent to persons of ordinary skill in the art after reading this disclosure how to implement communications between a mobile terminal according to the principles of the invention and other end points or terminals using various communication networks according to well-known industry standards and protocols. It will be apparent to persons of ordinary skill in the art after reading this disclosure how to implement user input adapters and user input devices in a mobile terminal according to the principles of the invention. It will be apparent to persons of ordinary skill in the art after reading this disclosure that the illustrated embodiments are exemplary and are not limiting of the invention. While this disclosure discusses various combinations of aspects of the invention, it is to be understood that the described inventions are intended to encompass all the various combinations of aspects of the invention that would be enabled by the disclosure.

What is claimed is:

1. A method comprising:
   at a field event location, receiving at a mobile terminal a speech signal that comprises information for formatting according to an actionable formal protocol requirement, including a required information content requirement and an information format requirement;
   extracting the information for formatting from the speech signal;
   representing the information in computer-readable form according to the formal protocol requirement;
   identifying at least one data processing system recipient of the information in computer-readable form;
   routing from the mobile the information in computer-readable form to the data processing system; and
   in response to the information, receiving at least one resource at the field event location,
   wherein the extracting step includes translating the speech signal from speech to text according to the actionable formal protocol requirement and wherein the translating from speech to text includes optimizing a speech to text dictionary according to the actionable formal protocol requirement.

2. The method of claim 1 wherein the mobile terminal comprises a plurality of user input modalities having differing input data formats, comprising the further step of normalizing user input data formats to a normalized format.

3. The method of claim 1 including the further steps of:
   storing computer readable information on the mobile terminal according to the formal protocol requirement and an associated brevity code identifying the computer readable information;
   recalling the computer readable information in response to the brevity code input via a user interface,
   and combining the computer readable information with the extracted information.

4. The method of claim 1 wherein the translating from speech to text includes mapping phonics according to the formal protocol requirement.

5. The method of claim 1 wherein the at least one data processing system recipient includes a plurality of data processing system recipients.

6. The method of claim 5 wherein the plurality of data processing system recipients includes at least another mobile terminal.

7. The method of claim 1 comprising the further step of associating other computer readable information with the extracted speech information, wherein the other computer readable information includes at least one of photo information, location information or biological information.

8. The method of claim 1 wherein the translating from speech to text includes optimizing a speech to text dictionary according to the formal protocol requirement.

9. The method of claim 1 comprising the further step of verifying at the terminal compliance of the information with the formal protocol requirements prior to routing the information to the data processing recipients.

10. A method comprising the steps of:
    at a field event location, receiving at a mobile terminal a speech signal that comprises information for formatting according to an actionable formal protocol requirement, including a required information content requirement and an information format requirement;
    extracting the information for formatting from the speech signal;
    representing the information in computer-readable form according to the formal protocol requirement;
    identifying at least one data processing system recipient of the information in computer-readable form;
    routing from the mobile the information in computer-readable form to the data processing system;

in response to the information, receiving at least one resource at the field event location;

storing in the mobile terminal partially completed computer information files in accordance the formal protocol requirements;

associating in the mobile terminal the partially completed computer information files with a brevity code;

recalling a selected one of the partially computer information files at the mobile terminal via a speech input; and completing the recalled computer information file.

11. The method of claim 1 wherein the mobile terminal comprises a plurality of user input modalities having differing input data formats, comprising the further step of normalizing user input data formats to a normalized format according to the actionable formal protocol.

12. A mobile terminal comprising:
a user interface having a plurality of user inputs, including a voice input;
a data processing system including a processor, memory and storage, the data processing system operable to execute functional modules;
at least one transceiver responsive to the data processing system and operable to communicate with at least one other terminal via a network connection, the functional modules including
a voice receiving module responsive to the voice input and operable to generate a speech signal that comprises information to be formatted according to an actionable formal protocol requirement, the formal protocol requirement including an information content requirement and an information format requirement;
a translation module operable to extract the information to be formatted from the speech signal and to represent the information in computer-readable form according to the formal protocol requirement;
a communication module responsive to the user interface and operable to route from the mobile terminal the information in computer-readable form to the at least one other terminal;
wherein the storage stores the formal protocol requirement and other computer readable information according to the formal protocol requirement and a brevity code identifying the other computer readable information, further comprising an association module responsive to a brevity code input via the user interface which when executed recalls the other computer readable information, wherein the translation module combines the computer readable information and the other computer readable information according the actionable formal protocol requirement.

13. The mobile terminal of claim 12 wherein the translation module includes a speech to text conversion module including a dictionary optimized according to the actionable formal protocol requirement.

14. The mobile terminal of claim 13 wherein the speech to text conversion module comprises a phonics mapping according to the formal protocol requirement.

15. The mobile terminal of claim 12 wherein the user interface includes a plurality of user input modalities having differing input data formats and the functional modules further including a data normalizing module operable to normalize the user input data formats to a normalized format according to the actionable formal protocol.

16. The mobile terminal of claim 12 further comprising a camera, a functional module for processing digital photos, and an association module for associating a digital photo with the computer-readable information.

17. The mobile terminal of claim 12 further comprising a geolocation functional module operable to generate position data and an association module for associating the position data with the computer readable information.

18. A system comprising:
a user interface having a plurality of user inputs, including a voice input;
a data processing system including a processor, memory and storage, the data processing system operable to execute functional modules;
at least one transceiver responsive to the data processing system and operable to communicate with at least one other terminal via a network connection, the functional modules including:
(i) a voice receiving module responsive to the voice input and operable to generate a speech signal that comprises information to be formatted according to an actionable formal protocol requirement, the formal protocol requirement including an information content requirement and an information format requirement;
(ii) a translation module operable to extract the information to be formatted from the speech signal and to represent the information in computer-readable form according to the formal protocol requirement;
(iii) a communication module responsive to the user interface and operable to route from the mobile terminal the information in computer-readable form to the at least one other terminal;
wherein the storage stores the formal protocol requirement and other computer readable information according to the formal protocol requirement and a brevity code identifying the other computer readable information, further comprising an association module responsive to a brevity code input via the user interface which when executed recalls the other computer readable information, wherein the translation module combines the computer readable information and the other computer readable information according the actionable formal protocol requirement;
a plurality of communication channel capability modules; and
a middleware server in network communication with the mobile terminal, and in network communication with a plurality of customer organization terminals over respective communication channels, the middleware server comprising a database;
wherein the mobile terminal routes the computer readable information to a selected customer organization terminal according to the actionable protocol via the middleware server.

19. The system of claim 18 wherein the middleware server causes the database to store data associated with mobile terminal interactions with customer organizations and where the middleware server manages communication methods between the mobile terminal and the customer organization terminals.

20. The system of claim 18 wherein the plurality of user inputs generate respective input data formats, the terminal comprising an input data normalizing module operable to normalize the input data formats to a normalized format according to the actionable formal protocol.

* * * * *